(12) United States Patent
Tomana et al.

(10) Patent No.: US 10,784,524 B2
(45) Date of Patent: Sep. 22, 2020

(54) POWER GENERATION CELL WITH REDUCED PRESSURE LOSS BETWEEN REACTANT GAS PASSAGE AND REACTANT GAS FLOW FIELD

(71) Applicant: HONDA MOTOR CO., LTD., Minato-ku, Tokyo (JP)

(72) Inventors: Yu Tomana, Wako (JP); Kentaro Ishida, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 106 days.

(21) Appl. No.: 16/108,460

(22) Filed: Aug. 22, 2018

(65) Prior Publication Data

US 2019/0067712 A1 Feb. 28, 2019

(30) Foreign Application Priority Data

Aug. 25, 2017 (JP) .................. 2017-162099

(51) Int. Cl.
| | |
|---|---|
| *H01M 8/0273* | (2016.01) |
| *H01M 8/026* | (2016.01) |
| *H01M 8/248* | (2016.01) |
| *H01M 8/0247* | (2016.01) |
| *H01M 8/0297* | (2016.01) |
| *H01M 8/24* | (2016.01) |
| *H01M 8/0254* | (2016.01) |
| *H01M 8/0232* | (2016.01) |
| *H01M 8/1018* | (2016.01) |

(52) U.S. Cl.
CPC ......... *H01M 8/0273* (2013.01); *H01M 8/026* (2013.01); *H01M 8/0232* (2013.01); *H01M 8/0247* (2013.01); *H01M 8/0254* (2013.01); *H01M 8/0297* (2013.01); *H01M 8/248* (2013.01); *H01M 8/2459* (2016.02); *H01M 2008/1095* (2013.01)

(58) Field of Classification Search
CPC ............ H01M 8/0273; H01M 8/2459; H01M 8/0232; H01M 8/0247; H01M 8/0254; H01M 8/026; H01M 8/0297; H01M 8/248
USPC ....................................... 429/457
See application file for complete search history.

(56) References Cited

U.S. PATENT DOCUMENTS

| | | | |
|---|---|---|---|
| 6,605,380 B2 | 8/2003 | Chen et al. | |
| 2009/0325036 A1* | 12/2009 | Blank ................. | H01M 8/0202 429/514 |
| 2010/0086820 A1* | 4/2010 | Owejan ............... | H01M 8/0258 429/514 |
| 2014/0134511 A1* | 5/2014 | Okabe ................. | H01M 8/0247 429/437 |

(Continued)

FOREIGN PATENT DOCUMENTS

JP 2008-130433 6/2008

*Primary Examiner* — Sean P Cullen
(74) *Attorney, Agent, or Firm* — Amin, Turocy & Watson, LLP

(57) ABSTRACT

A first metal separator of a power generation cell includes boss pairs. Each of the boss pairs includes two first bosses provided adjacent to a hole and adjacent to each other between a passage bead and an oxygen-containing gas flow field. A gap facing the hole is formed between the two first bosses. The second metal separator includes one second boss facing the boss pair through a resin film. The second boss extends over the two first bosses as viewed in a separator thickness direction.

11 Claims, 10 Drawing Sheets

(56) References Cited

U.S. PATENT DOCUMENTS

| | | | |
|---|---|---|---|
| 2016/0102410 A1* | 4/2016 | Speidel | C25B 9/18 |
| | | | 429/434 |
| 2017/0012300 A1* | 1/2017 | Gaugler | H01M 8/0282 |
| 2018/0219233 A1* | 8/2018 | Ishida | H01M 8/0258 |
| 2018/0269497 A1* | 9/2018 | Kunz | H01M 8/0254 |

* cited by examiner

POWER GENERATION CELL WITH REDUCED PRESSURE LOSS BETWEEN REACTANT GAS PASSAGE AND REACTANT GAS FLOW FIELD

CROSS-REFERENCE TO RELATED APPLICATION

This application is based upon and claims the benefit of priority from Japanese Patent Application No. 2017-162099 filed on Aug. 25, 2017, the contents of which are incorporated herein by reference.

BACKGROUND OF THE INVENTION

Field of the Invention

The present invention relates to a power generation cell including a metal separator having a bead seal and bosses.

Description of the Related Art

In general, a solid polymer electrolyte fuel cell employs a solid polymer electrolyte membrane. The solid polymer electrolyte membrane is a polymer ion exchange membrane. The fuel cell includes a membrane electrode assembly (MEA). The membrane electrode assembly is formed by providing an anode on one surface of the solid polymer electrolyte membrane, and providing a cathode on the other surface of the solid polymer electrolyte membrane. The membrane electrode assembly is sandwiched between separators (bipolar plates) to form a power generation cell (unit cell). In use, a predetermined number of power generation cells are stacked together to form, e.g., an in-vehicle fuel cell stack mounted in a vehicle.

In the power generation cell, a fuel gas flow field is formed between the MEA and one of the separators, as one of reactant gas flow fields, and an oxygen-containing flow field is formed between the MEA and the other of the separators, as the other of the reactant gas flow fields. Further, a plurality of reactant gas passages extend through the power generation cell in the stacking direction.

In recent years, in an attempt to reduce the quantity of the relatively expensive solid polymer electrolyte membrane, and protect the thin solid polymer electrolyte membrane having the low strength, a resin film equipped MEA including a resin film having a frame shape in its outer periphery has been adopted (see, e.g., Japanese Laid-Open Patent Publication No. 2008-130433).

In the power generation cell, seals for preventing leakage of an oxygen-containing gas and a fuel gas as reactant gases and a coolant are provided. In the power generation cell, as the separators, metal separators may be used. For example, according to the disclosure in the specification of U.S. Pat. No. 6,605,380, in order to reduce the production cost, as the seals for the metal separators, ridge shaped bead seals are formed by press forming.

Further, in some cases, bosses may be provided between reactant gas passages and reactant gas flow field (power generation area), for allowing a reactant gas to flow from the reactant gas supply passages to the reactant gas flow field smoothly. In the case where a resin film equipped MEA is provided between metal separators having bosses to form a power generation cell, the resin film is held (supported) between bosses of one of the metal separators and bosses of the other of the metal separators facing the bosses of the one of the metal separators.

SUMMARY OF THE INVENTION

The present invention has been made to take the above problem into consideration, and an object of the present invention is provide a power generation cell in which it is possible to reduce the pressure loss between a reactant gas passage and a reactant gas flow field, and reduce the stress applied to the resin film.

In order to achieve the above object, the present invention provides a power generation cell including a resin film equipped MEA including a membrane electrode assembly and a resin film provided on an outer end of the membrane electrode assembly, and metal separators provided on both sides of the resin film equipped MEA, respectively. The power generation cell is formed by stacking the resin film equipped MEA and the metal separators together. Each of the metal separators includes a reactant gas flow field configured to allow a reactant gas to flow along an electrode surface of the membrane electrode assembly, a reactant gas passage connected to the reactant gas flow field and penetrating through the metal separators in a separator thickness direction, and a passage bead provided for sealing, around the reactant gas passage and protruding in the separator thickness direction. One of the metal separators includes a hole connected to an internal space of the passage bead connected to the reactant gas passage, and a boss pair comprising two first bosses provided adjacent to the hole and adjacent to each other between the passage bead and the reactant gas flow field. A gap facing the hole is formed between the two first bosses. Another of the metal separators includes one second boss facing the boss pair through the resin film, and the second boss extends over the two first bosses as viewed in a separator thickness direction.

Preferably, an area of a top part of the second boss is larger than a total area of top parts of the two first bosses.

Preferably, a connection channel configured to connect the reactant gas passage and the reactant gas flow field is provided between the reactant gas passage and the hole, and the connection channel is formed between the one of the metal separators and the other of the metal separators.

Preferably, the passage bead of the other of the metal separators facing the passage bead connected to the hole of the one of the metal separators through the resin film does not have any hole connecting the reactant gas flow field and the reactant gas passage provided in the other of the metal separators.

Preferably, the one of the metal separators including the two first bosses is a separator including a fuel gas flow field on a same surface as a surface where the boss pair is provided, for allowing a fuel gas to flow along an electrode surface, and the other of the metal separators including the second boss is a separator including an oxygen-containing gas flow field on a same surface as a surface where the second boss is provided, for allowing an oxygen-containing gas to flow along an electrode surface.

Preferably, the second boss has an oval shape or an ellipse shape in a plan view.

In the power generation cell of the present invention, one of the metal separators includes the boss pair comprising two first bosses, and the other of the metal separators includes one second boss facing the boss pair through the resin film. The first bosses are provided adjacent to the hole and adjacent to each other between the passage bead and the reactant gas flow field. Further, the second boss extends over the two first bosses as viewed in the separator thickness direction. In the structure, on the surface of the one of the separators where the reactant gas flow field is provided, the reactant gas can pass through the space between the two first bosses of the boss pair. Therefore, it becomes possible to reduce the pressure loss between the reactant gas passage and the reactant gas flow field. Further, since the second boss extends over the two first bosses, and capable of holding (supporting) the resin film, it is possible to reduce the stress applied to the resin film.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Hereinafter, a preferred embodiment of a power generation cell according to the present invention will be described with reference to the accompanying drawings.

Figure 1:
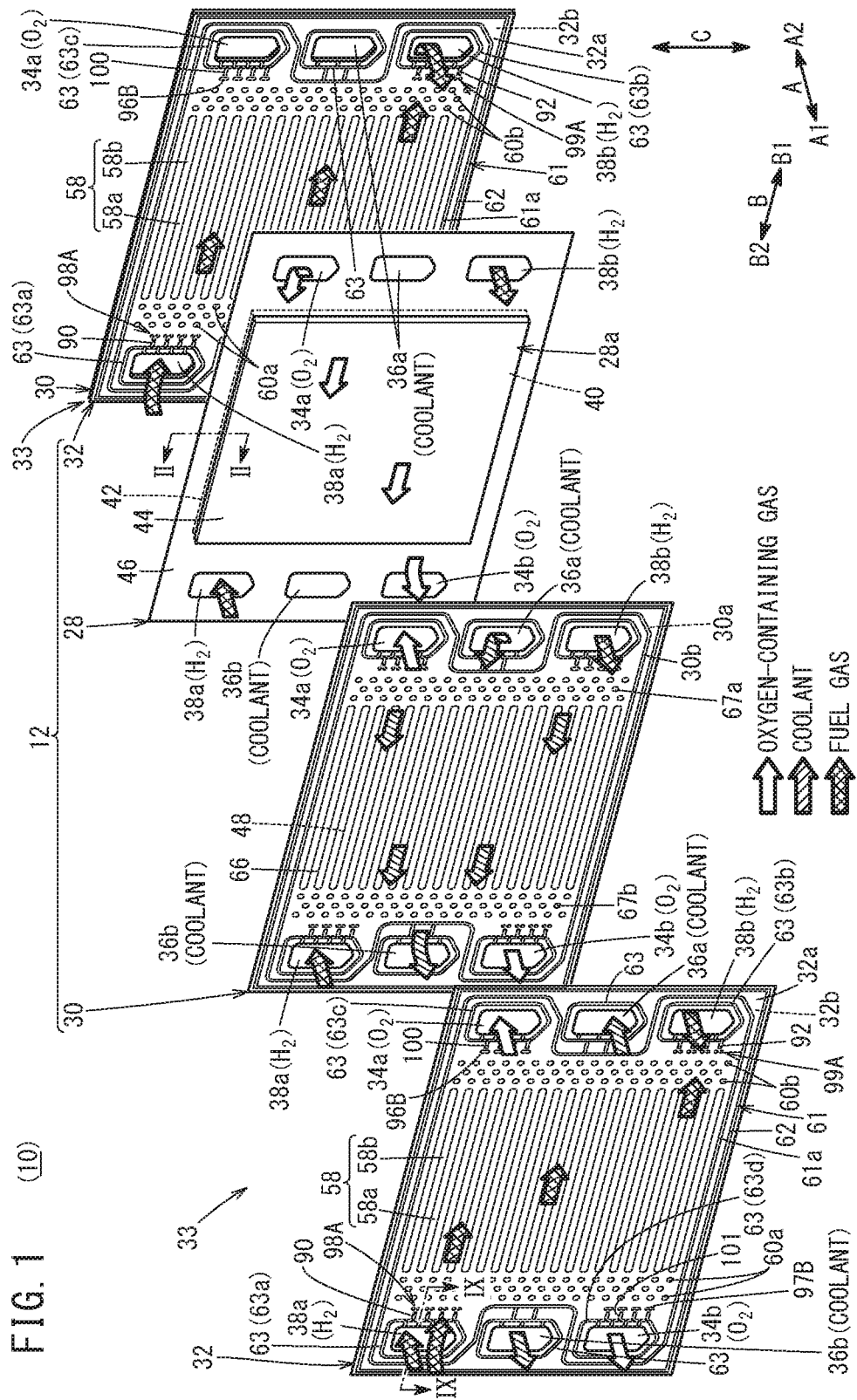
FIG. 1 is an exploded perspective view showing a power generation cell according to an embodiment of the present invention.

A power generation cell 12 of a unit fuel cell shown in FIG. 1 includes a resin film equipped MEA 28 including a membrane electrode assembly and a resin film 46 provided on an outer end of the membrane electrode assembly, a first metal separator 30 provided on one surface (indicated by an arrow A1) of the resin film equipped MEA 28, and a second metal separator 32 provided on the other surface of the resin film equipped MEA 28 (in the direction indicated by an arrow A2). For example, a plurality of the power generation cells 12 are stacked together in a horizontal direction indicated by an arrow A or in a direction of gravity indicated by an arrow C, and a tightening load (compression load) in the stacking direction is applied to the power generation cells 12 to form a fuel cell stack 10. For example, the fuel cell stack 10 is mounted in a fuel cell electric automobile (not shown) as an in-vehicle fuel cell stack.

Each of the first metal separator 30 and the second metal separator 32 is formed by press forming of a metal thin plate to have a corrugated shape in cross section. For example, the metal plate is a steel plate, a stainless steel plate, an aluminum plate, a plated steel plate, or a metal plate having an anti-corrosive surface by surface treatment. In the state where the first metal separator 30 of one of the adjacent power generation cells 12 and the second metal separator 32 of the other of the adjacent power generation cells 12 face each other, the outer ends of the first metal separator 30 and the second metal separator 32 are joined together by welding, brazing, crimping, etc. to form a joint separator 33.

At one end of the power generation cell 12 in the longitudinal direction indicated by an arrow B (one end in a horizontal direction indicated by an arrow B1), an oxygen-containing gas supply passage 34a, a coolant supply passage 36a, and a fuel gas discharge passage 38b are provided. The oxygen-containing gas supply passage 34a, the coolant supply passage 36a, and the fuel gas discharge passage 38b extend through the power generation cell 12 in the stacking direction (indicated by the arrow A). The oxygen-containing gas supply passage 34a, the coolant supply passage 36a, and the fuel gas discharge passage 38b are arranged in the vertical direction (indicated by an arrow C). An oxygen-containing gas is supplied through the oxygen-containing gas supply passage 34a. A coolant such as water is supplied through the coolant supply passage 36a. A fuel gas such as a hydrogen-containing gas is discharged through the fuel gas discharge passage 38b.

At the other end of the power generation cell 12 in the longitudinal direction (the other end indicated by an arrow B2), a fuel gas supply passage 38a, a coolant discharge passage 36b, and an oxygen-containing gas discharge passage 34b are provided. The fuel gas supply passage 38a, the coolant discharge passage 36b, and the oxygen-containing gas discharge passage 34b extend through the power generation cell 12 in the stacking direction. The fuel gas supply passage 38a, the coolant discharge passage 36b, and the oxygen-containing gas discharge passage 34b are arranged in the vertical direction. The fuel gas is supplied through the fuel gas supply passage 38a. The coolant is discharged through the coolant discharge passage 36b. The oxygen-containing gas is discharged through the oxygen-containing gas discharge passage 34b. The layout of the oxygen-containing gas supply passage 34a, the oxygen-containing gas discharge passage 34b, the fuel gas supply passage 38a, and the fuel gas discharge passage 38b are not limited to the embodiment of the present invention, and may be determined according to the required specification.

Figure 2:
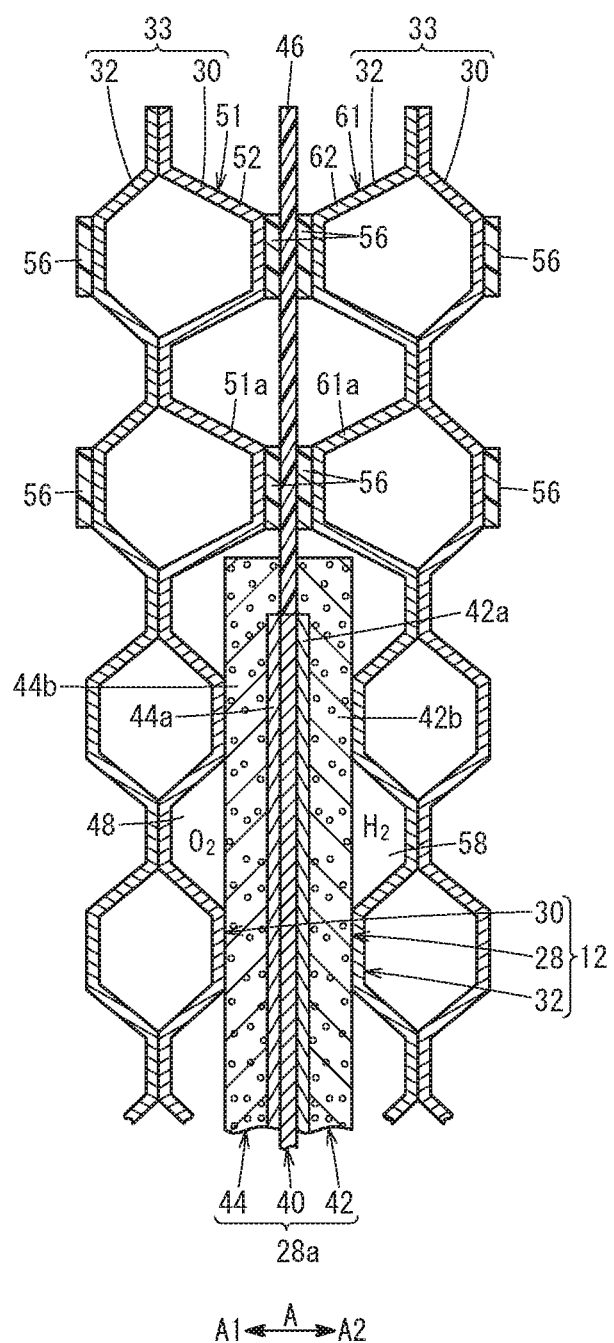
FIG. 2 is a cross sectional view showing a main part of a power generation cell taken along a line II-II in FIG. 1.

As shown in FIG. 2, the resin film equipped MEA 28 includes a membrane electrode assembly 28a, and the frame shaped resin film 46 provided in the outer portion of the membrane electrode assembly 28a. The membrane electrode assembly 28a includes an electrolyte membrane 40, and an anode 42 and a cathode 44 sandwiching the electrolyte membrane 40.

For example, the electrolyte membrane 40 includes a solid polymer electrolyte membrane (cation ion exchange membrane). For example, the solid polymer electrolyte membrane is a thin membrane of perfluorosulfonic acid containing water. The electrolyte membrane 40 is sandwiched between the anode 42 and the cathode 44. A fluorine based electrolyte may be used as the electrolyte membrane 40. Alternatively, an HC (hydrocarbon) based electrolyte may be used as the electrolyte membrane 40.

The cathode 44 includes a first electrode catalyst layer 44a joined to one surface of the electrolyte membrane 40, and a first gas diffusion layer 44b stacked on the first electrode catalyst layer 44a. The anode 42 includes a second electrode catalyst layer 42a joined to the other surface of the electrolyte membrane 40 and a second gas diffusion layer 42b stacked on the second electrode catalyst layer 42a.

The inner end surface of the resin film 46 is positioned close to, overlapped with, or contacts the outer end surface of the electrolyte membrane 40. As shown in FIG. 1, at an end of the resin film 46 in the direction indicated by the arrow B1, the oxygen-containing gas supply passage 34a, the coolant supply passage 36a, and the fuel gas discharge passage 38b are provided. At an end of the resin film 46 in the direction indicated by the arrow B2, the fuel gas supply passage 38a, the coolant discharge passage 36b, and the oxygen-containing gas discharge passage 34b are provided.

For example, the resin film 46 is made of PPS (poly phenylene sulfide), PPA (polyphthalamide), PEN (polyethylene naphthalate), PES (polyethersulfone), LCP (liquid crystal polymer), PVDF (polyvinylidene fluoride), silicone resin, fluororesin, m-PPE (modified poly phenylene ether resin), PET (polyethylene terephthalate), PBT (polybutylene terephthalate), or modified polyolefin. It should be noted that the electrolyte membrane 40 may be configured to protrude outward without using the resin film 46. Alternatively, a frame shaped film may be provided on both sides of the electrolyte membrane 40 which protrudes outward.

Figure 3:
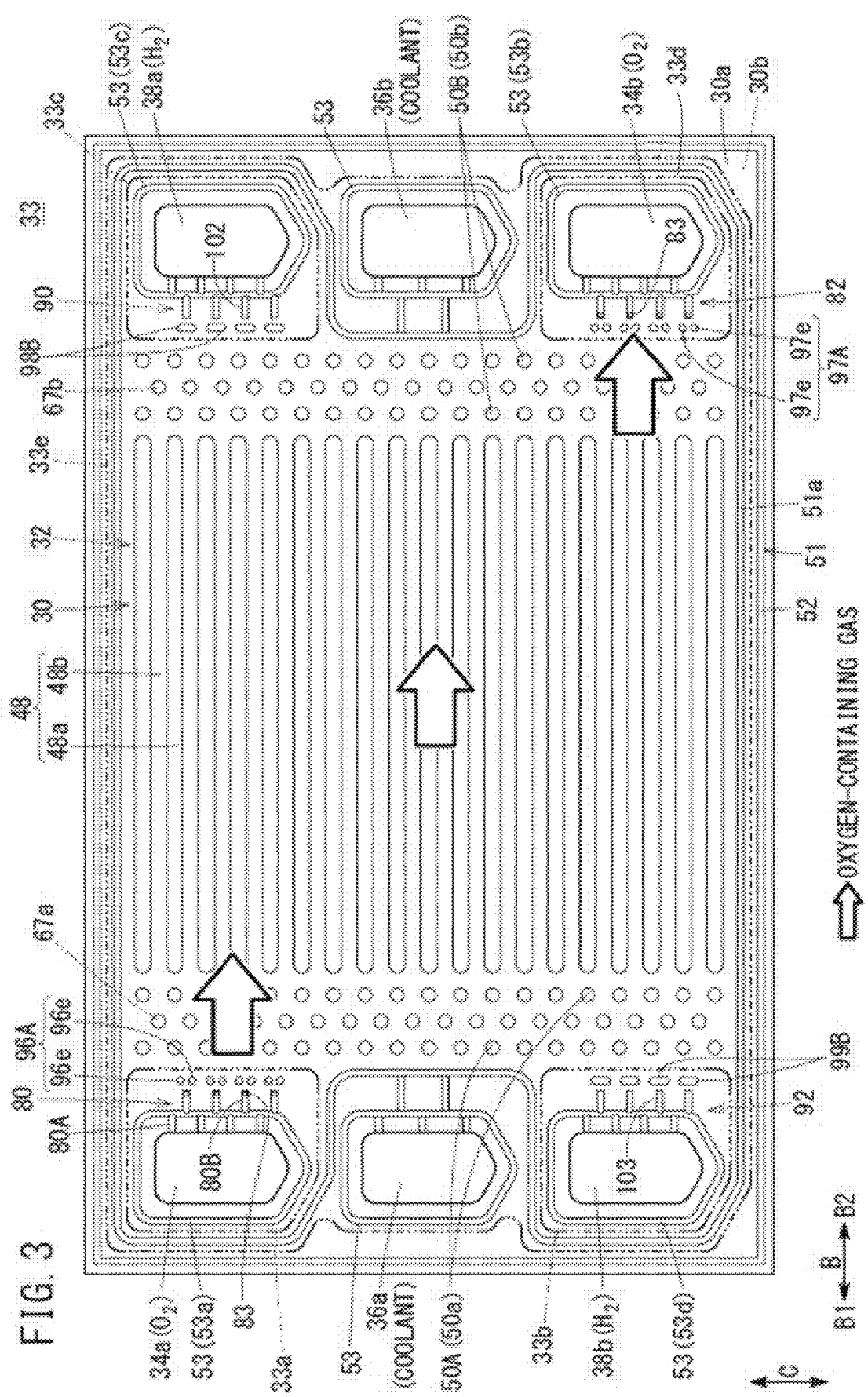
FIG. 3 is a plan view showing a first metal separator as viewed from an oxygen-containing gas flow field.

As shown in FIG. 3, an oxygen-containing gas flow field 48 is provided on a surface 30a of the first metal separator 30 facing the resin film equipped MEA 28 (hereinafter referred to as the "surface 30a"). For example, the oxygen-containing gas flow field 48 extends in the direction indicated by the arrow B.

The oxygen-containing gas flow field 48 is connected to (in fluid communication with) the oxygen-containing gas supply passage 34a and the oxygen-containing gas discharge passage 34b. The oxygen-containing gas flow field 48 includes straight flow grooves 48b between a plurality of ridges 48a extending in the direction indicated by the arrow B. Instead of the plurality of straight flow grooves 48b, a plurality of wavy or serpentine flow grooves may be provided.

An inlet buffer 50A is provided on the surface 30a of the first metal separator 30, between the oxygen-containing gas supply passage 34a and the oxygen-containing gas flow field 48. The inlet buffer 50A includes a plurality of boss arrays each including a plurality of bosses 50a arranged in a direction indicated by an arrow C. Further, an outlet buffer 50B is provided on the surface 30a of the first metal separator 30, between the oxygen-containing gas discharge passage 34b and the oxygen-containing gas flow field 48. The outlet buffer 50B includes a plurality of boss arrays each including a plurality of bosses 50b. The bosses 50a, 50b protrude toward the resin film equipped MEA 28.

On a surface 30b of the first metal separator 30, on the other side of the oxygen-containing gas flow field 48, boss arrays each including a plurality of bosses 67a arranged in the direction indicated by the arrow C are provided between the boss arrays of the inlet buffer 50A, and boss arrays each including a plurality of bosses 67b arranged in the direction indicated by the arrow C are provided between the boss arrays of the outlet buffer 50B. The bosses 67a, 67b protrude toward the resin film equipped MEA 28. The bosses 67a, 67b form a buffer on the coolant surface.

A first seal line 51 is formed on the surface 30a of the first metal separator 30 by press forming. The first seal line 51 is expanded toward the resin film equipped MEA 28 (FIG. 1). As shown in FIG. 2, resin material 56 is fixed to each protruding front surface of the first seal line 51 by printing, coating, etc. For example, polyester fiber is used as the resin material. The resin material 56 may be provided on the part of the resin film 46. The resin material 56 is not essential. The resin material 56 may be dispensed with.

As shown in FIG. 3, the first seal line 51 includes a bead seal 51a (hereinafter also referred to as the "inner bead 51a") provided around the oxygen-containing gas flow field 48, the inlet buffer 50A and the outlet buffer 50B, a bead seal 52 (hereinafter also referred to as the "outer bead 52") provided outside the inner bead 51a along the outer end of the first metal separator 30, and a plurality of bead seals 53 (hereinafter also referred to as the "passage beads 53") provided around the plurality of fluid passages (oxygen-containing gas supply passage 34a, etc.), respectively. The outer bead 52 protrudes from the surface 30a of the first metal separator 30 toward the resin film equipped MEA 28, and the outer bead 52 is provided along the outer marginal portion of the surface 30a of the first metal separator 30. The bead seals 51a, 52, 53 tightly contact the resin film 46, and has seal structure where the space between the bead seals 51a, 52, 53 and the resin film 46 is sealed in an air-tight and liquid tight manner, by elastic deformation by the tightening force applied in the stacking direction.

The plurality of passage beads 53 protrude from the surface 30a of the first metal separator 30 toward the resin film equipped MEA 28. The passage beads 53 are provided around the oxygen-containing gas supply passage 34a, the oxygen-containing gas discharge passage 34b, the fuel gas supply passage 38a, the fuel gas discharge passage 38b, the coolant supply passage 36a, and the coolant discharge passage 36b, respectively.

Hereinafter, among the plurality of passage beads 53, the passage bead formed around the oxygen-containing gas supply passage 34a will be referred to as the "passage bead 53a", and the passage bead formed around the oxygen-containing gas discharge passage 34b will be referred to as the "passage bead 53b". The first metal separator 30 has bridge sections 80, 82 connecting the inside of the passage beads 53a, 53b (fluid passages 34a, 34b) and the outside (oxygen-containing gas flow field 48) of the passage beads 53a, 53b.

The bridge section 80 is provided on a side part of the passage bead 53a formed around the oxygen-containing gas supply passage 34a, adjacent to the oxygen-containing gas flow field 48. The bridge section 82 is provided on a side part of the passage bead 53b formed around the oxygen-containing gas discharge passage 34b, adjacent to the oxygen-containing gas flow field 48.

The first metal separator 30 and the second metal separator 32 of the joint separator 33 are joined together by laser welding lines 33a to 33e. The laser welding line 33a is formed around the oxygen-containing gas supply passage 34a and the bridge section 80. The laser welding line 33b is formed around the fuel gas discharge passage 38b and a bridge section 92 described later. The laser welding line 33c is formed around the fuel gas supply passage 38a and a bridge section 90 described later. The laser welding line 33d is formed around the oxygen-containing gas discharge passage 34b and the bridge section 82. The laser welding line 33e is formed around the oxygen-containing gas flow field 48, the oxygen-containing gas supply passage 34a, the oxygen-containing gas discharge passage 34b, the fuel gas supply passage 38a, the fuel gas discharge passage 38b, the coolant supply passage 36a, and the coolant discharge passage 36b along the outer end of the joint separator 33.

The passage bead 53a and the passage bead 53b have the same structure. Further, the bridge section 80 adjacent to the oxygen-containing gas supply passage 34a and the bridge section 82 adjacent to the oxygen-containing gas discharge passage 34b have the same structure. Therefore, hereinafter, the structure of the passage bead 53a and the bridge section 80 will be described in detail as a representative example, and the detailed description about the structure of the passage bead 53*b* and the bridge section 82 will be omitted.

Figure 5:
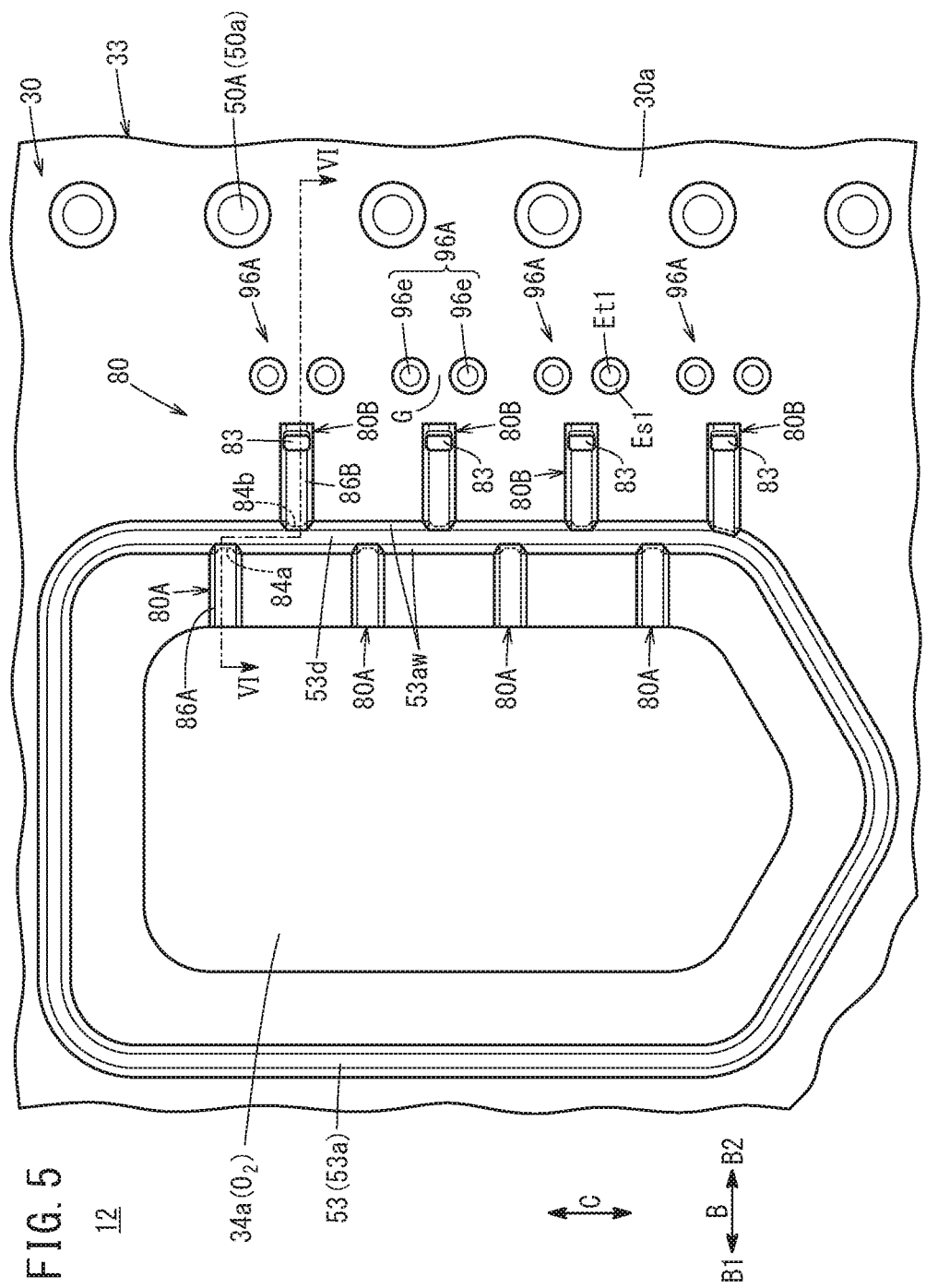
FIG. 5 is a partial enlarged front view showing a joint separator as viewed from a first metal separator.

As show in FIG. 5, the bridge section 80 includes a plurality of inner bridges 80A provided at intervals (clearances) inside the passage bead 53*a*, and a plurality of outer bridges 80B provided at intervals (clearances) outside the passage bead 53*a*.

Each of the inner bridges 80A includes a through hole 84*a* provided on one side of the passage bead 53*a* (side wall 53*aw* on the inner side of the passage bead 53*a*) and an inner tunnel 86A connected to the through hole 84*a*. The inner tunnel 86A is formed by press forming to protrude from the side wall 53*aw* of the passage bead 53*a* toward the oxygen-containing gas supply passage 34*a*. An end of the inner tunnel 86A opposite to the side connected to the passage bead 53*a* is opened to the oxygen-containing gas supply passage 34*a*.

Each of the outer bridges 80B includes a through hole 84*b* provided on the other side of the passage bead 53*a* (side wall 53*aw* on the outer side of the passage bead 53*a*) and an outer tunnel 86B connected to the through hole 84*b*. The outer tunnel 86B is formed by press forming, to protrude from the side wall 53*aw* of the passage bead 53*a* toward the oxygen-containing gas flow field 48. The distance between the gap G and a hole 83 is shorter than the protruding length of the outer tunnel 86B from the passage bead 53*a*. The width of the gap G (distance between first bosses 96*e*) is smaller than the width of the outer tunnel 86B.

In the embodiment of the present invention, the plurality of inner bridges 80A and the plurality of outer bridges 80B are provided alternately (in a zigzag pattern) along the passage bead 53*a*. The plurality of inner bridges 80A and the plurality of outer bridges 80B may be provided to face each other through the passage bead 53*a*.

Figure 6:
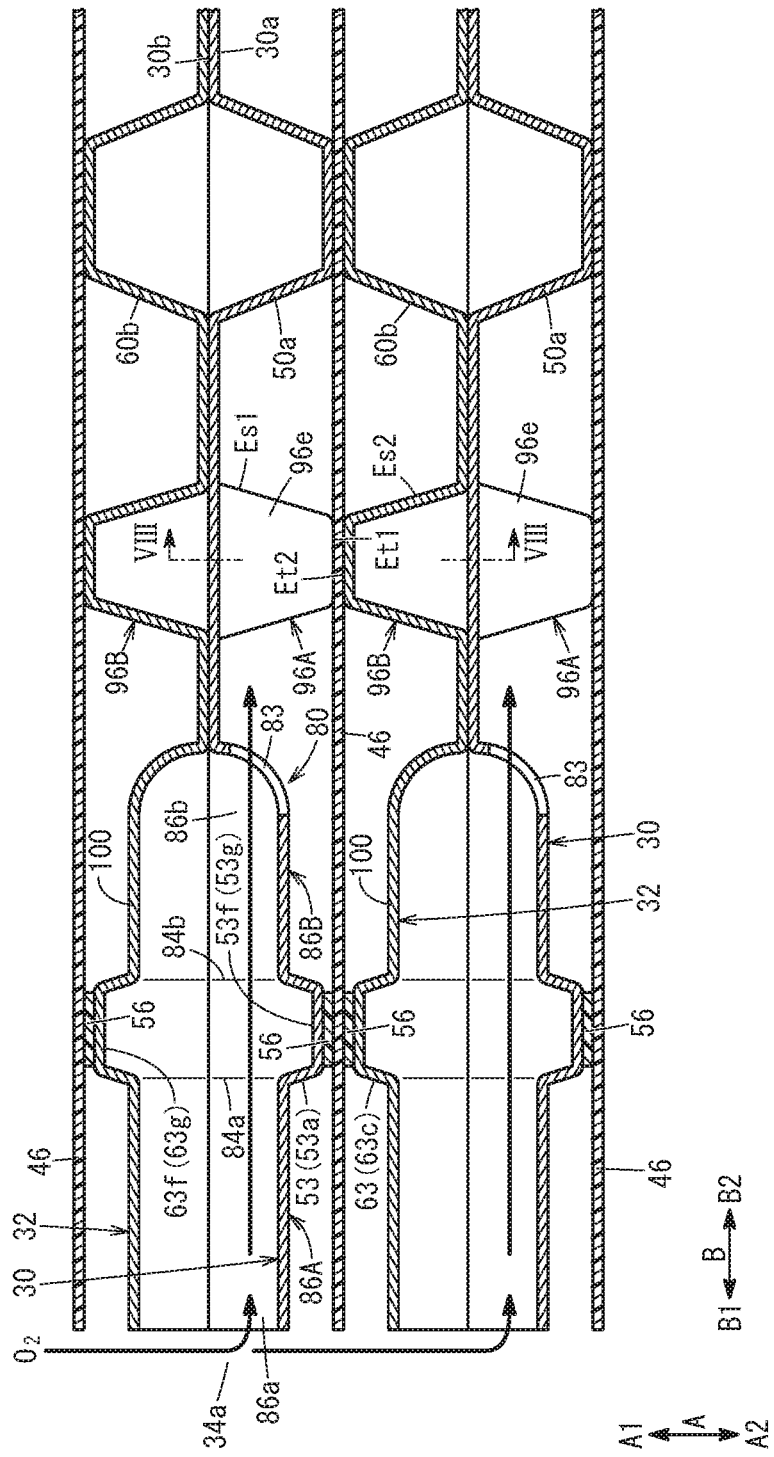
FIG. 6 is a cross sectional view showing a power generation cell taken along a line VI-VI in FIG. 5.

As shown in FIG. 6, a recess 53*f* is provided in the first metal separator 30, on the back side of the ridge shaped passage bead 53*a*. The recess 53*f* forms an internal space 53*g* of the passage bead 53*a*. The through holes 84*a*, 84*b* connect the internal space 53*g* of the passage bead 53*a* to the outside. The recess 53*f* of the first metal separator 30 faces a recess 63*f* of the second metal separator 32 on the back surface of a passage bead 63. In the structure, the internal space 53*g* of the passage bead 53*a* of the first metal separator 30 is connected to an internal space 63*g* of the passage bead 63 of the second metal separator 32.

Each of the inner tunnels 86A and the outer tunnels 86B has a ridge shape protruding from the surface 30*a* of the first metal separator 30 toward the resin film equipped MEA 28, and includes tunnel channels 86*a*, 86*b* connected to the internal space 53*g* of the passage bead 53*a* through the through holes 84*a*, 84*b*. The inner tunnels 86A connect the oxygen-containing gas supply passage 34*a* and the internal space 53*g*. The outer tunnels 86B connect the internal space 53*g* and the oxygen-containing gas flow field 48 (FIG. 3). The hole 83 is provided at an end (protruding end) of each of the outer tunnels 86B opposite to a portion connected to the passage bead 53*a*. The hole 83 extends from the inside to the outside of the outer tunnel 86B.

As shown in FIG. 1, a fuel gas flow field 58 is formed on a surface 32*a* (hereinafter referred to as the "surface 32*a*") of the second metal separator 32 facing the resin film equipped MEA 28, and extends in the direction indicated by the arrow B.

Figure 4:
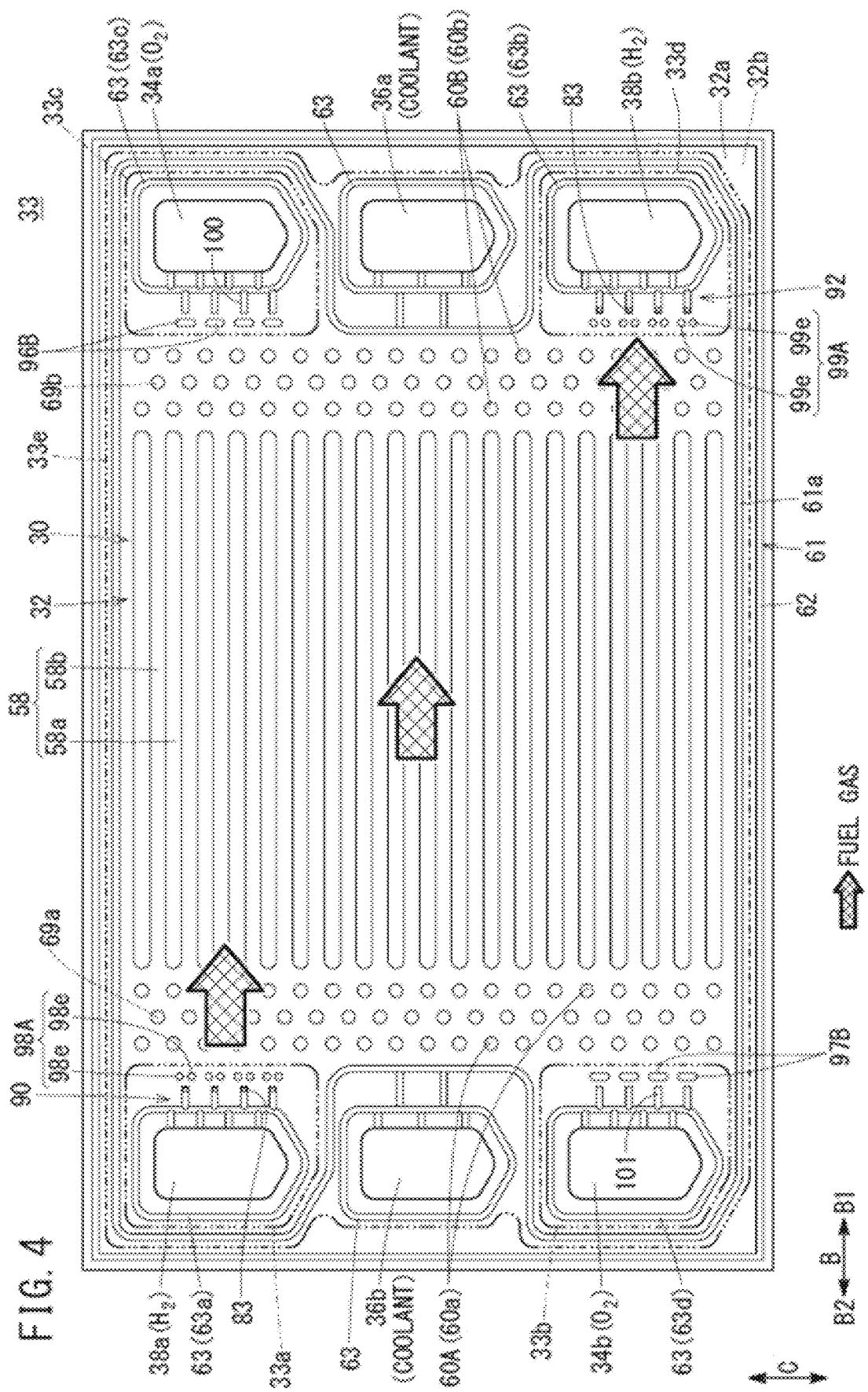
FIG. 4 is a plan view showing a second metal separator as viewed from a fuel gas flow field.

As shown in FIG. 4, the fuel gas flow field 58 is connected to (in fluid communication with) the fuel gas supply passage 38*a* and the fuel gas discharge passage 38*b*. The fuel gas flow field 58 includes straight flow grooves 58*b* between a plurality of ridges 58*a* extending in the direction indicated by the arrow B. A plurality of wavy or serpentine flow grooves may be provided instead of the plurality of straight flow grooves 58*b*.

An inlet buffer 60A is provided on the surface 32*a* of the second metal separator 32, between the fuel gas supply passage 38*a* and the fuel gas flow field 58. The inlet buffer 60A includes a plurality of boss arrays each including a plurality of bosses 60*a* extending in the direction indicated by the arrow C. Further, on the surface 32*a* of the second metal separator 32, an outlet buffer 60B including a plurality of boss arrays is provided between the fuel gas discharge passage 38*b* and the fuel gas flow field 58. Each of the boss arrays includes a plurality of bosses 60*b*. The bosses 60*a*, 60*b* protrude toward the resin film equipped MEA 28.

On a surface 32*b* of the second metal separator 32, on the other side of the fuel gas flow field 58, boss arrays each including a plurality of bosses 69*a* arranged in the direction indicated by the arrow C are provided between boss arrays of the inlet buffer 60A, and boss arrays each including a plurality of bosses 69*b* arranged in the direction indicated by the arrow C are provided between the boss arrays of the outlet buffer 60B. The bosses 69*a*, 69*b* protrude toward the resin film equipped MEA 28. The bosses 69*a*, 69*b* form a buffer on the coolant surface.

A second seal line 61 is formed on the surface 32*a* of the second metal separator 32. The second seal line 61 is expanded toward the resin film equipped MEA 28.

As shown in FIG. 2, resin material 56 is fixed to each protruding front end surface of the second seal line 61 by printing, welding, etc. For example, polyester fiber is used as the resin material. The resin material 56 may be provided on the part of the resin film 46. The resin material 56 is not essential. The resin material 56 may be dispensed with.

As shown in FIG. 4, the second seal line 61 includes a bead seal (hereinafter referred to as the "inner bead 61*a*") provided around the fuel gas flow field 58, the inlet buffer 60A and the outlet buffer 60B, and a bead seal (hereinafter referred to as the "outer bead 62") provided outside the inner bead 61*a* along the outer end of the second metal separator 32, and a plurality of bead seals (hereinafter referred to as the "passage beads 63") provided around the plurality of fluid passages (fluid passage 38*a*, etc.), respectively. The outer bead 62 protrudes from the surface 32*a* of the second metal separator 32. The outer bead 62 is provided along the outer marginal portion of the surface 32*a* of the second metal separator 32.

The plurality of passage beads 63 protrude from the surface 32*a* of the second metal separator 32. The passage beads 63 are provided around the oxygen-containing gas supply passage 34*a*, the oxygen-containing gas discharge passage 34*b*, the fuel gas supply passage 38*a*, the fuel gas discharge passage 38*b*, the coolant supply passage 36*a*, and the coolant discharge passage 36*b*, respectively.

The second metal separator 32 has bridge sections 90, 92. The bridge sections 90, 92 connect the inside (fluid passages 38*a*, 38*b*) of passage beads 63*a*, 63*b* formed around the fuel gas supply passage 38*a* and the fuel gas discharge passage 38*b*, respectively, and the outside (fuel gas flow field 58) of the passage beads 63*a*, 63*b*.

The bridge section 90 is provided on a side part of the passage bead 63*a* formed around the fuel gas supply passage 38*a*, adjacent to the fuel gas flow field 58. The bridge section 92 is provided on a side part of the passage bead 63*b* of the fuel gas discharge passage 38*b*, adjacent to the fuel gas flow field 58. The bridge section 92 includes bridges provided at intervals (clearances).

The bridge sections 90, 92 provided in the second metal separator 32 and the bridge sections 80, 82 (FIG. 3) provided in the first metal separator 30 have the same structure. The passage beads 63a, 63b have the same structure and the layout as the above described passage beads 53a, 53b (FIG. 3).

As shown in FIG. 1, a coolant flow field 66 is formed between the surface 30b of the first metal separator 30 and the surface 32b of the second metal separator 32 that are joined together. The coolant flow field 66 is connected to (in fluid communication with) the coolant supply passage 36a and the coolant discharge passage 36b. The coolant flow field 66 is formed by stacking together a back surface of the first metal separator 30 (the back side of the oxygen-containing gas flow field 48) and a back surface of the second metal separator 32 (the back side of the fuel gas flow field 58). The first metal separator 30 and the second metal separator 32 are joined together by welding outer ends and areas around the fluid passages. The first metal separator 30 and the second metal separator 32 may be joined together by brazing, instead of welding.

As shown in FIG. 3, the first metal separator 30 includes boss pairs 96A each comprising the two first bosses 96e provided adjacent to the hole 83 in the bridge section 80. The first bosses 96e are provided adjacent to each other, between the passage bead 53a and the oxygen-containing gas flow field 48. As shown in FIG. 5, a gap G facing the hole 83 is formed between the two first bosses 96e. That is, the hole 83 is positioned between the two first bosses 96e. In the embodiment of the present invention, the plurality of boss pairs 96A are provided. That is, the boss pairs 96A are provided adjacent to a plurality of the holes 83 provided in the bridge section 80, respectively.

The plurality of boss pairs 96A form a part of the inlet buffer 50A adjacent to the bridge section 80. The plurality of boss pairs 96A are provided in a straight line as viewed in the separator thickness direction. It should be noted that the plurality of boss pairs 96A may not be provided in a straight line as viewed in the separator thickness direction. In the embodiment of the present invention, each of the first bosses 96e has a circular shape (shape in the separator thickness direction) in a plan view.

As shown in FIG. 6, the top part Et1 (protruding end) of the first boss 96e contacts one surface of the resin film 46. In the embodiment of the present invention, a lateral circumferential wall Es1 of the first boss 96e is inclined from the separator thickness direction (indicated by the arrow A). Thus, the first boss 96e has a trapezoidal shape in cross section taken along the separator thickness direction. It should be noted that the lateral circumferential wall Es1 of the first boss 96e may be in parallel to the separator thickness direction. That is, the first boss 96e may have a rectangular shape in cross section taken along the separator thickness direction.

Figure 8:
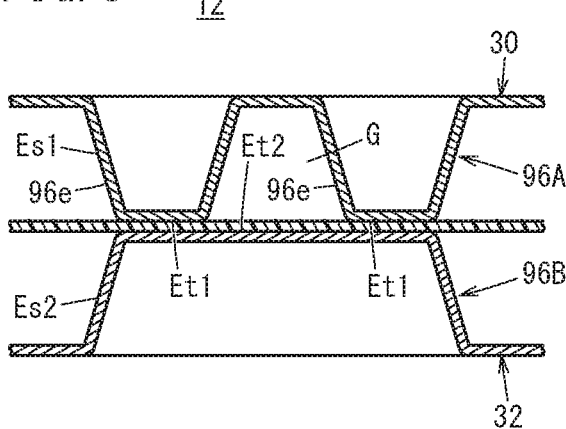
FIG. 8 is a cross sectional view showing a power generation cell taken along a line VIII-VIII in FIG. 6.

As shown in FIGS. 6 and 8, the second metal separator 32 has second bosses 96B facing the boss pair 96A through the resin film 46. The top part Et2 (protruding end) of the second boss 96B contacts the other surface of the resin film 46. In the embodiment of the present invention, the lateral circumferential wall Es2 of the second boss 96B is inclined from the separator thickness direction (indicated by the arrow A). Therefore, the second boss 96B has a trapezoidal shape in cross section taken along the separator thickness direction. It should be noted that the lateral circumferential wall Es2 of the second boss 96B may be in parallel to the separator thickness direction. That is, the second boss 96B may have a rectangular shape in cross section taken along the separator thickness direction.

Figure 7:
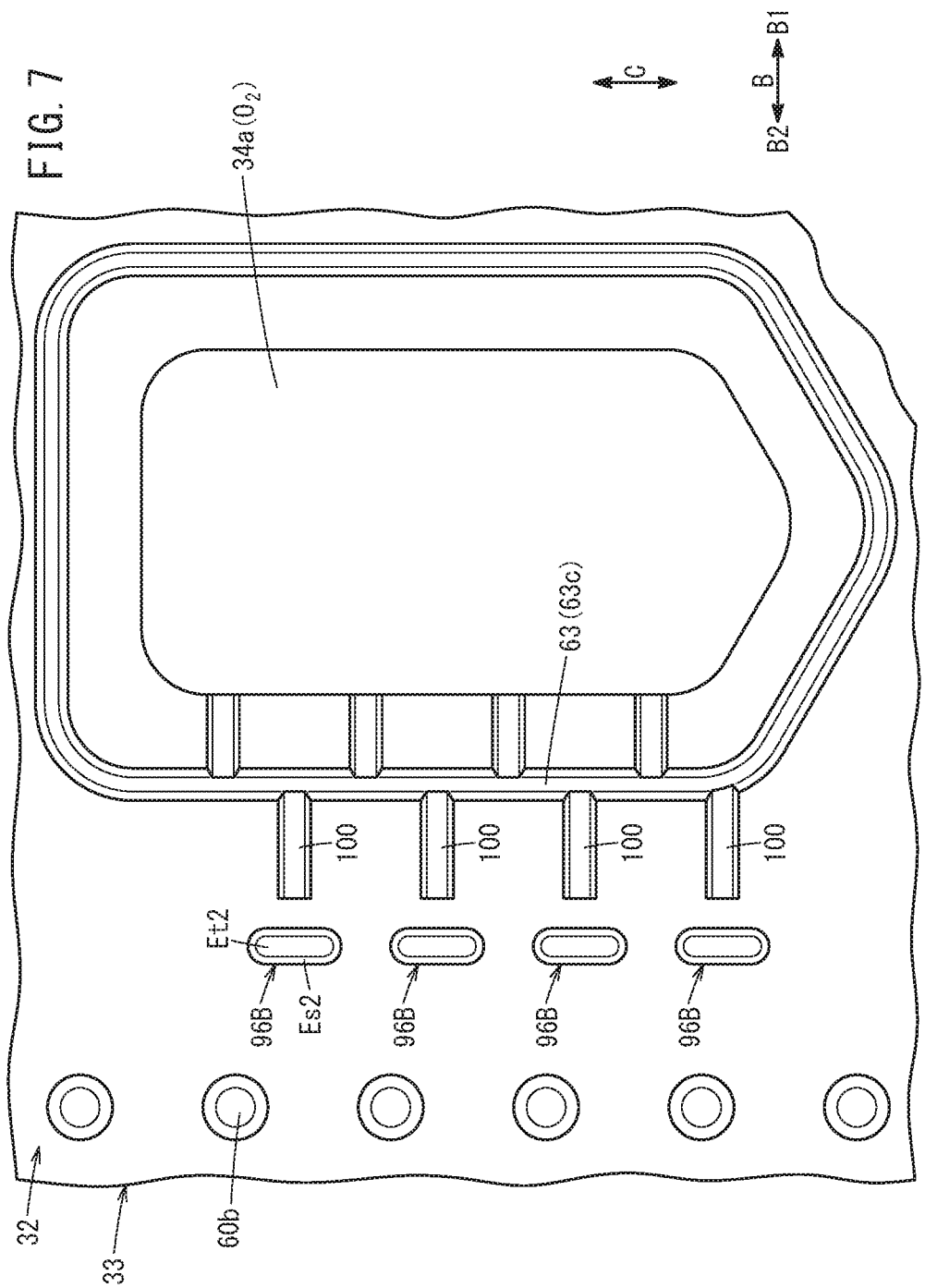
FIG. 7 is a partially-enlarged front view showing a joint separator as viewed from a second metal separator.

As shown in FIG. 7, the second bosses 96B are provided adjacent to tunnels 100 extending from a passage bead 63c toward the outlet buffer 60B. The passage bead 63c faces the passage bead 53a (passage bead 53 which has the holes 83, and provided around the oxygen-containing gas supply passage 34a) through the resin film 46. The passage bead 63c does not have any hole connecting the oxygen-containing gas supply passage 34a and the fuel gas flow field 58 (FIG. 1).

A plurality of the second bosses 96B are provided in the second metal separator 32, in correspondence with the plurality of boss pairs 96A (FIG. 5) provided in the first metal separator 30. The second bosses 96B are provided in a straight line as viewed in the separator thickness direction. Depending on the layout of the boss pairs 96A, the second bosses 96B does not have to be provided in the straight line as viewed in the separator thickness direction. The second boss 96B has a shape including the two first bosses 96e (FIG. 5) as viewed in the separator thickness direction. It is adequate that the area between the two first bosses 96e is simply supported by the one second boss 96B. Therefore, it is only necessary for the second boss 96B to have a shape which includes at least part of each of the two first bosses 96e, and which extends over the two first bosses 96e, as viewed in the separator thickness direction. In the embodiment of the present invention, the surface shape of the second boss 96B has an oval shape (including two parallel sides and circular arcs at both ends in the longitudinal direction). The second boss 96B may have an ellipse shape. The ellipse shape does not have to be a geometrically perfect ellipse shape. The area of the top part Et2 of the second boss 96B is larger than the total area of the top parts Et1 of the two first bosses 96e.

As shown in FIG. 3, the first metal separator 30 include a plurality of boss pairs 97A comprising two first bosses 97e which are positioned adjacent to the hole 83 provided in the bridge section 82 on the outlet side, and adjacent to each other between the passage bead 53b and the oxygen-containing gas flow field 48. The boss pair 97A has the same structure as the boss pair 96A provided adjacent to the bridge section 80 on the inlet side.

As shown in FIG. 4, the second metal separator 32 includes a plurality of second bosses 97B. The second bosses 97B face the plurality of boss pairs 97A (FIG. 3) of the first metal separator 30 through the resin film 46. The second bosses 97B are provided adjacent to tunnels 101 protruding from a passage bead 63d around the oxygen-containing gas discharge passage 34b toward the fuel gas flow field 58. The second boss 97B has the same structure as the second boss 96B provided adjacent to the oxygen-containing gas supply passage 34a. The second boss 97B has a shape including the two first bosses 97e of the first metal separator 30 as viewed in the separator thickness direction. It is adequate that the area between the two first bosses 97e is simply supported by one second boss 97B. Therefore, it is only necessary for the second boss 97B to have a shape which includes at least part of each of the two first bosses 97e, and which extends over the two first bosses 97e, as viewed in the separator thickness direction. The area of the top part of the second boss 97B is larger than the total area of the top parts of the two first bosses 97e.

The second metal separator 32 includes a plurality of boss pairs 98A each comprising two first bosses 98e which are positioned adjacent to the hole 83 provided in the bridge section 90, and adjacent to each other between the passage bead 63*a* and the fuel gas flow field 58. The boss pair 98A has the same structure as the boss pair 96A provided adjacent to the bridge section 80 on the inlet side of the first metal separator 30. The plurality of boss pairs 98A form a part of the inlet buffer 60A adjacent to the bridge section 90.

As shown in FIG. 3, the first metal separator 30 includes a plurality of second bosses 98B. The second bosses 98B face the plurality of boss pairs 98A of the second metal separator 32 through the resin film 46, respectively. The second bosses 98B are provided adjacent to tunnels 102 protruding from the passage bead 53*c* around the fuel gas supply passage 38*a* toward the oxygen-containing gas flow field 48. The second boss 98B has the same structure as the second boss 96B (FIGS. 4 and 7) provided in the second metal separator 32. The second boss 98B has a shape including the two first bosses 98*e* of the second metal separator 32 as viewed in the separator thickness direction. It is adequate that the area between the two first bosses 98*e* is simply supported by one second boss 98B. Therefore, it is only necessary for the second boss 98B to have a shape which includes at least part of each of the two first bosses 98*e*, and which extends over the two first bosses 98*e*, as viewed in the separator thickness direction. The area of the top part of the second boss 98B is larger than the total area of the top parts of the two first bosses 98*e*.

As shown in FIG. 4, the second metal separator 32 includes a plurality of boss pairs 99A each comprising two first bosses 99*e* which are positioned adjacent to the hole 83 provided in the bridge section 92 on the outlet side, and adjacent to each other between the passage bead 63*b* and the fuel gas flow field 58. The boss pair 99A has the same structure as the boss pair 97A provided adjacent to the bridge section 82 on the outlet side of the first metal separator 30. The plurality of boss pairs 99A form a part of the outlet buffer 60B adjacent to the bridge section 92.

As shown in FIG. 3, the first metal separator 30 includes a plurality of second bosses 99B. The second bosses 99B face the plurality of boss pairs 99A (FIG. 4) of the second metal separator 32 through the resin film 46 (e.g., FIG. 1). The second bosses 99B are provided adjacent to tunnels 103 protruding from the passage bead 53*d* around the fuel gas discharge passage 38*b* toward the oxygen-containing gas flow field 48. The second boss 99B has the same structure as the second boss 97B (FIG. 4) provided in the second metal separator 32. The second boss 99B has a shape including the two first bosses 99*e* of the second metal separator 32 as viewed in the separator thickness direction. It is adequate that the area between the two first bosses 99*e* is simply supported by one second boss 99B. Therefore, it is only necessary for the second boss 99B to have a shape which includes at least part of each of the two first bosses 99*e*, and which extends over the two first bosses 99*e*, as viewed in the separator thickness direction. The area of the top part of the second boss 99B is larger than the total area of the top parts of the two first bosses 99*e*.

Operation of the power generation cell 12 having the above structure will be described below.

First, as shown in FIG. 1, an oxygen-containing gas such as air is supplied to the oxygen-containing gas supply passage 34*a*. A fuel gas such as a hydrogen-containing gas is supplied to the fuel gas supply passage 38*a*. Coolant such as pure water, ethylene glycol, oil is supplied to the coolant supply passages 36*a*.

As shown in FIG. 3, the oxygen-containing gas flows from the oxygen-containing gas supply passage 34*a* into the oxygen-containing gas flow field 48 of the first metal separator 30 through the bridge section 80. At this time, as shown in FIG. 6, the oxygen-containing gas flows from the oxygen-containing gas supply passage 34*a* toward the surface 30*b* of the first metal separator 30 (space between the first metal separator 30 and the second metal separator 32) temporarily, and flows through the inner tunnel 86A (tunnel channel 86*a*), the passage bead 53*a* (internal space 53*g*) and the outer tunnel 86B (tunnel channel 86*b*), and then, the oxygen-containing gas flows from the holes 83 toward the surface 30*a* of the first metal separator 30. Then, as shown in FIG. 1, the oxygen-containing gas flows along the oxygen-containing gas flow field 48 in the direction indicated by the arrow B, and the oxygen-containing gas is supplied to the cathode 44 of the membrane electrode assembly 28*a*.

Figure 9:
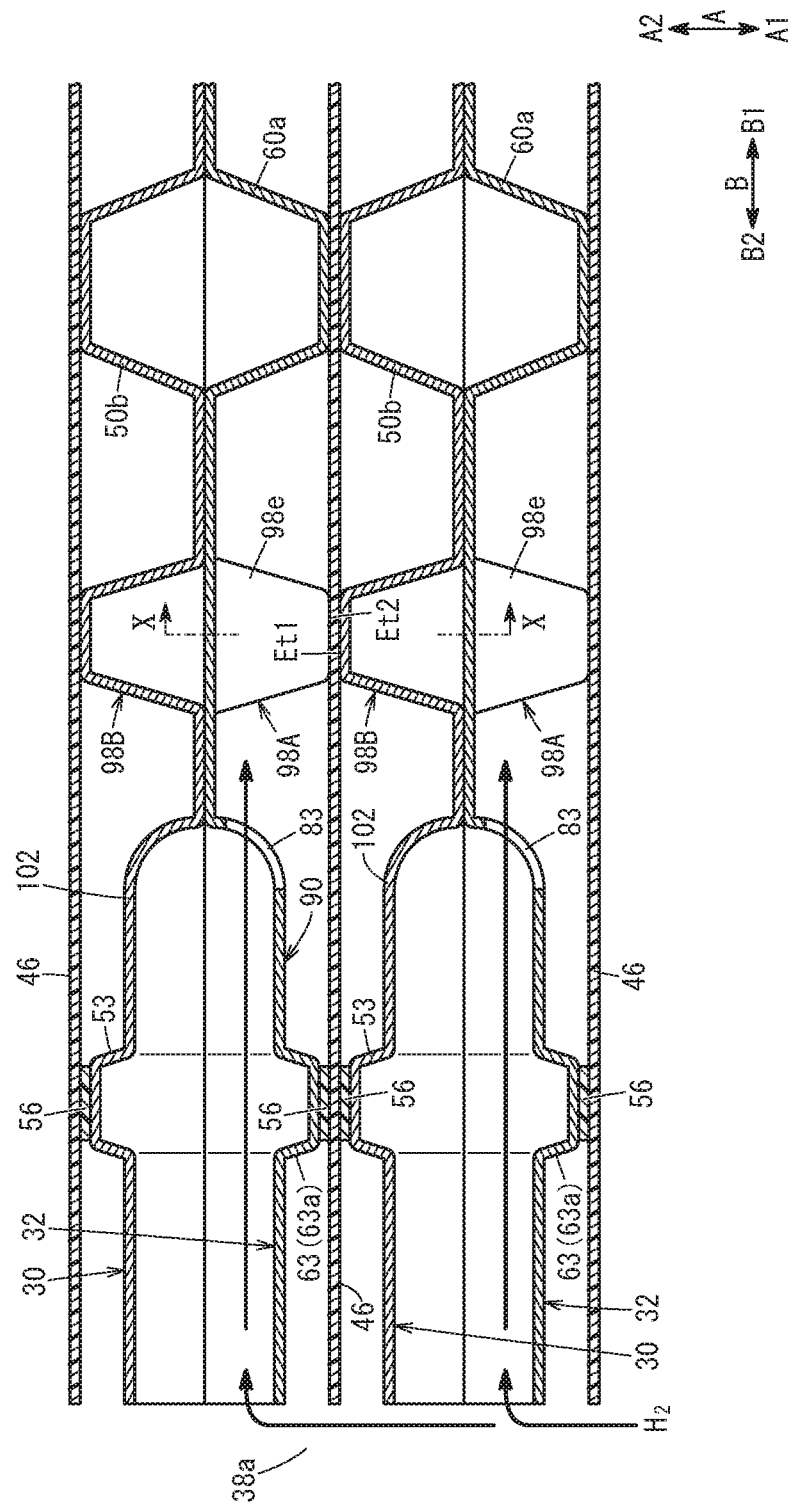
FIG. 9 is a cross sectional view of a power generation cell taken along a line IX-IX in FIG. 1.
Figure 10:
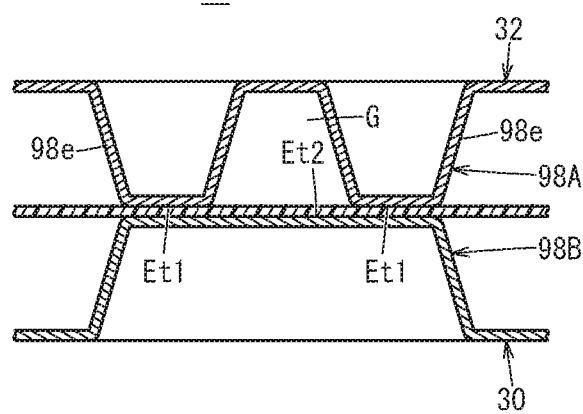
FIG. 10 is a cross sectional view taken along a line X-X in FIG. 9.

In the meanwhile, as shown in FIGS. 4 and 9, the fuel gas flows from the fuel gas supply passage 38*a* through the bridge section 90 into the fuel gas flow field 58 of the second metal separator 32. The fuel gas flows along the fuel gas flow field 58 in the direction indicated by the arrow B, and the fuel gas is supplied to the anode 42 of the membrane electrode assembly 28*a*.

Thus, in each of the membrane electrode assemblies 28*a*, the oxygen-containing gas supplied to the cathode 44 and the fuel gas supplied to the anode 42 are partially consumed in the electrochemical reactions in the first electrode catalyst layer 44*a* and the second electrode catalyst layer 42*a* to generate electricity.

Then, after the oxygen-containing gas supplied to the cathode 44 is partially consumed at the cathode 44, the oxygen-containing gas from the oxygen-containing gas flow field 48 flows through the bridge section 82 toward the oxygen-containing gas discharge passage 34*b*, and then, the oxygen-containing gas is discharged along the oxygen-containing gas discharge passage 34*b* in the direction indicated by the arrow A. Likewise, after the fuel gas supplied to the anode 42 is partially consumed at the anode 42, the fuel gas from the fuel gas flow field 58 flows through the bridge section 92 (FIG. 4) toward the fuel gas discharge passage 38*b*, and then, the fuel gas is discharged along the fuel gas discharge passage 38*b* in the direction indicated by the arrow A.

Further, the coolant supplied to the coolant supply passage 36*a* flows into the coolant flow field 66 formed between the first metal separator 30 and the second metal separator 32, and then, the coolant flows in the direction indicated by the arrow B. After the coolant cools the membrane electrode assembly 28*a*, the coolant is discharged from the coolant discharge passage 36*b*.

In this case, the power generation cell 12 of the embodiment of the present invention offers the following advantages.

In the power generation cell 12, the first metal separator 30 includes the boss pairs 96A, 97A (FIG. 3). Each of the boss pairs 96A, 97A comprises the two first bosses 96*e*, 97*e* adjacent to the hole 83, and provided adjacent to each other between the passage beads 53*a*, 53*b* and the oxygen-containing gas flow field 48. The second metal separator 32 includes the second bosses 96B, 97B facing the boss pairs 96A, 97A through the resin film 46 (FIG. 4). Then, each of the second bosses 96B, 97B extends over the two first bosses 96*e*, 97*e* as viewed in the separator thickness direction.

In the structure, on the surface of the first metal separator 30 where the oxygen-containing gas flow field 48 is provided, the oxygen-containing gas can pass through the space between the two first bosses 96*e* of the boss pair 96A and the space between the two first bosses 97*e* of the boss pair 97A. Therefore, it becomes possible to reduce the pressure loss between the oxygen-containing gas supply passage 34a and the oxygen-containing gas flow field 48, and between the oxygen-containing gas discharge passage 34b and the oxygen-containing gas flow field 48. Further, since each of the second bosses 96B, 97B extends over the two first bosses 96e, 97e to hold (support) the resin film 46, it becomes possible to reduce the stress applied to the resin film 46.

Further, the second metal separator 32 includes the boss pairs 98A, 99A (FIG. 4). Each of the boss pairs 98A, 99A is provided adjacent to the hole 83, and comprises the two first bosses 98e, 99e provided adjacent to each other, between the passage beads 63a, 63b and the fuel gas flow field 58. The first metal separator 30 includes the second bosses 98B, 99B (FIG. 3) which faces the boss pairs 98A, 99A, respectively, through the resin film 46. Each of the second bosses 98B, 99B extends over the two first bosses 98e, 99e as viewed in the separator thickness direction, respectively.

Therefore, on the surface of the second metal separator 32 where the fuel gas flow field 58 is provided, since the fuel gas can pass through the space between the two first bosses 98e of the boss pair 98A and the space between the two first bosses 99e of the boss pair 99A, it is possible to reduce the pressure loss between the fuel gas supply passage 38a and the fuel gas flow field 58, and between the fuel gas discharge passage 38b and the fuel gas flow field 58. Further, since each of the second bosses 98B, 99B extends over the two first bosses 98e, 99e to hold (support) the resin film 46, it becomes possible to reduce the stress applied to the resin film 46. In the case where the power generation cell 12 is applied to a fuel cell system where the pressure of the fuel gas supplied to the fuel gas flow field 58 is higher than the pressure of the oxygen-containing gas supplied to the oxygen-containing gas flow field 48, the resin film 46 is pressed toward the second metal separator 32, i.e., pressed toward the second bosses 98B, 99B by the pressure difference between the fuel gas and the oxygen-containing gas. At this time, the resin film 46 is supported by the second boss 98B having a shape including the two first bosses 98e and the second boss 99B having a shape including the two first bosses 99e. Therefore, it is possible to suitably reduce the stress applied to the resin film 46 by the pressure difference.

Connection channels (bridge sections 80, 82, 90, 92) connecting the reactant gas passages and reactant gas flow fields (the oxygen-containing gas flow field 48, the fuel gas flow field 58) are provided between the reactant gas passages (fluid passages 34a, 34b, 38a, 38b) and the holes 83. Further, the connection channels are formed between the first metal separator 30 and the second metal separator 32 (FIGS. 6 and 9). With the simple structure, it is possible to provide the connection channels in the power generation cell 12.

The passage beads 63c, 63d of the second metal separator 32 facing the passage beads 53a, 53b connected to the hole 83 of the first metal separator 30 through the resin film 46 do not have any holes connecting the fuel gas flow field 58 and the oxygen-containing gas supply passage 34a and the oxygen-containing gas discharge passage 34b. In the structure, since no hole as a passage of the reactant gas is provided adjacent to the second bosses 96B, 97B provided in the second metal separator 32, even if the gap G like the boss pairs 96A, 97A is not provided, the pressure loss of the fuel gas flowing through the fuel gas flow field 58 provided in the second metal separator 32 is not increased.

Further, the passage beads 53c, 53d of the first metal separator 30 facing the passage beads 63a, 63b connected to the hole 83 of the second metal separator 32 through the resin film 46 do not have any holes connecting the oxygen-containing gas flow field 48 and the fuel gas supply passage 38a and the fuel gas discharge passage 38b. In the structure, since no hole as a passage of the reactant gas is provided adjacent to the second bosses 98B, 99B provided in the first metal separator 30, even if the gap G like the boss pairs 98A, 99A is not provided, the pressure loss of the oxygen-containing gas flowing through the oxygen-containing gas flow field 48 provided in the first metal separator 30 is not increased.

The present invention is not limited to the above described embodiment. Various modifications may be made without departing from the gist of the present invention.

What is claimed is:

1. A power generation cell comprising:
   a resin film equipped MEA including a membrane electrode assembly and a resin film provided on an outer end of the membrane electrode assembly; and
   metal separators provided on both sides of the resin film equipped MEA, respectively, the power generation cell being formed by stacking the resin film equipped MEA and the metal separators together,
   wherein each of the metal separators comprises a reactant gas flow field configured to allow a reactant gas to flow along an electrode surface of the membrane electrode assembly, a reactant gas passage connected to the reactant gas flow field and penetrating through the metal separators in a separator thickness direction, and a passage bead provided for sealing, around the reactant gas passage and protruding in the separator thickness direction, and
   wherein one of the metal separators includes a hole connected to an internal space of the passage bead connected to the reactant gas passage, and a boss pair comprising two first bosses provided adjacent to the hole and adjacent to each other between the passage bead and the reactant gas flow field,
   a gap facing the hole is formed between the two first bosses,
   another of the metal separators includes one second boss facing the boss pair through the resin film, and
   the second boss extends over the two first bosses as viewed in the separator thickness direction.

2. The power generation cell according to claim 1, wherein an area of a top part of the second boss is larger than a total area of top parts of the two first bosses.

3. The power generation cell according to claim 1, wherein the second boss has an oval shape or an ellipse shape in a plan view.

4. The power generation cell according to claim 1, wherein a connection channel configured to connect the reactant gas passage and the reactant gas flow field is provided between the reactant gas passage and the hole, and
   the connection channel is formed between the one of the metal separators and the other of the metal separators.

5. The power generation cell according to claim 1, wherein the passage bead of the other of the metal separators facing the passage bead connected to the hole of the one of the metal separators, through the resin film, does not have any hole connecting the reactant gas flow field and the reactant gas passage provided in the other of the metal separators.

6. The power generation cell according to claim 1, wherein the one of the metal separators including the two first bosses is a separator including a fuel gas flow field on a same surface as a surface where the boss pair is provided, for allowing a fuel gas to flow along a first electrode surface, and the other of the metal separators including the second boss is a separator including an oxygen-containing gas flow field on a same surface as a surface where the second boss is provided, for allowing an oxygen-containing gas to flow along a second electrode surface.

7. The power generation cell according to claim 1, wherein a plurality of the boss pairs are provided in the one of the metal separators, and a plurality of the second bosses are provided in the other of the metal separators.

8. The power generation cell according to claim 7, wherein the plurality of the boss pairs are arranged in a straight line as viewed in the separator thickness direction, and the plurality of the second bosses are arranged in a straight line in the separator thickness direction.

9. The power generation cell according to claim 1, wherein the one of the metal separators includes an outer tunnel protruding from the passage bead toward the gap, and connected to the internal space of the passage bead, and the hole is provided at a protruding end of the outer tunnel.

10. The power generation cell according to claim 9, wherein a distance between the gap and the hole is shorter than a protruding length of the outer tunnel from the passage bead.

11. The power generation cell according to claim 9, wherein a width of the gap is smaller than a width of the outer tunnel.

* * * * *